(12) United States Patent
Nolan et al.

(10) Patent No.: US 10,735,346 B2
(45) Date of Patent: Aug. 4, 2020

(54) DATA BLOCK PRIORITIZATION FOR INTERNET OF THINGS PAYLOADS

(71) Applicant: INTEL CORPORATION, Santa Clara, CA (US)

(72) Inventors: Keith Nolan, Mullingar (IE); John Brady, Celbridge (IE); Mark Kelly, Leixlip (IE); Charlie Sheridan, Ballivor (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/859,448

(22) Filed: Dec. 30, 2017

(65) Prior Publication Data

US 2019/0036841 A1    Jan. 31, 2019

(51) Int. Cl.
| | |
|---|---|
| G06F 15/173 | (2006.01) |
| H04L 12/911 | (2013.01) |
| H04L 29/08 | (2006.01) |
| H04W 28/02 | (2009.01) |

(52) U.S. Cl.
CPC ............ *H04L 47/821* (2013.01); *H04L 67/12* (2013.01); *H04W 28/0215* (2013.01)

(58) Field of Classification Search
CPC . H04L 47/6275; H04L 47/22; H04L 47/2441; H04L 65/601; H04L 47/821; H04L 67/12; H04W 28/0215
See application file for complete search history.

(56) References Cited

U.S. PATENT DOCUMENTS

| | | |
|---|---|---|
| 9,430,320 B1 | 8/2016 | Li et al. |
| 2004/0064467 A1* | 4/2004 | Kola ................. H04L 29/06 |
| 2012/0162682 A1* | 6/2012 | Tomiyasu ............ G06F 3/1222 358/1.13 |
| 2012/0201256 A1 | 8/2012 | Heise et al. |
| 2012/0230200 A1 | 9/2012 | Wentink |
| 2013/0246839 A1 | 9/2013 | Werner et al. |
| 2013/0279427 A1* | 10/2013 | Wentink ............ H04W 52/0216 370/329 |
| 2014/0146676 A1* | 5/2014 | Howes ................. H04L 47/2441 370/235 |
| 2014/0146677 A1* | 5/2014 | Howes .................. H04L 47/22 370/235 |
| 2014/0297225 A1* | 10/2014 | Petroski ................ H04B 13/02 702/188 |
| 2015/0256470 A1 | 9/2015 | Stanwood et al. |
| 2018/0006764 A1* | 1/2018 | Howes ................. H04L 65/605 |

OTHER PUBLICATIONS

International Search Report for related PCT Application PCT/US2018/063881 filed Dec. 4, 2018 dated Mar. 12, 2019, 10 pages.

\* cited by examiner

*Primary Examiner* — Oleg Survillo
(74) *Attorney, Agent, or Firm* — International IP Law Group, P.L.L.C.

(57) ABSTRACT

An IoT device Internet of Things (IoT) device including storage to store instructions and a processor to execute the stored instructions to prioritize data blocks of a data payload by dynamically assigning priority levels of the data blocks, and to transmit one or more of the data blocks based on the prioritizing.

22 Claims, 12 Drawing Sheets

100

200

400

DATA BLOCK PRIORITIZATION FOR INTERNET OF THINGS PAYLOADS

TECHNICAL FIELD

The present techniques relate generally to Internet of Things (IoT) devices, including, for example, IoT devices that can perform remote sensing and actuation functions. More specifically, the present techniques relate to data prioritization (for example, data block prioritization) for IoT payloads.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the internet of things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

In this view, the Internet will become a communications system for devices, and networks of devices, to not only communicate with data centers, but with each other. The devices may form functional networks, or virtual devices, to perform functions, which may dissolve once the function is performed. Challenges exist in enabling reliable, secure, and identifiable devices that can form networks as needed to accomplish tasks.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
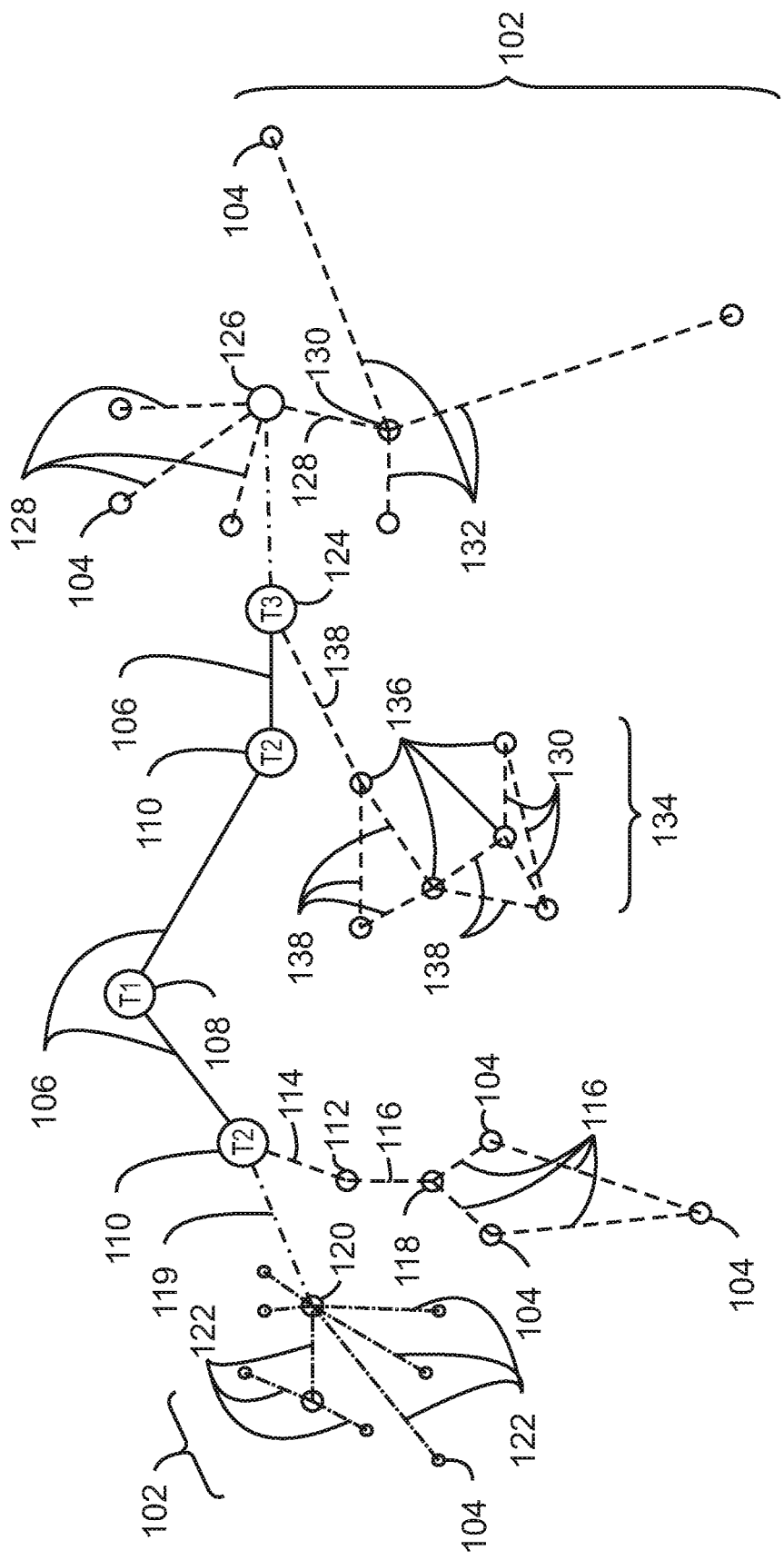
FIG. 1 illustrates interconnections that may be present in the Internet in accordance with some embodiments.

Some embodiments relate to data (or data block) prioritization for Internet of Things (IoT) payloads. Some embodiments relate to data prioritization for heterogeneous edge and fog payloads using dynamic judicious weighting, with no human intervention required.

IoT data or data blocks can sometimes also be referred to as packets or fragments. IoT payloads can include complex payload data types (for example, those that require packet fragmentation due to packet size, cost or energy constraints per transmission, etc.) Such complex payload data types can include, for example, large images or files. If all fragments are considered as being an equal priority level, it may not be possible to take advantage of efficiency gains that are possible according to some embodiments in which complex payloads can be considered as a set of weighted fragments with differing priorities.

Some embodiments can relate to long range acquisition of data that may not be able to be transmitted all at once (for example, long range acquisition of data that might be quite large or complex, such as image or video data). If such data are being transmitted across many packets and one of those packets gets lost, the position of the packet residing in the original payload is very important. If certain data are lost, recreation of the overall payload at the receiving end may not be possible. However, other portions of the payload may not be as important at the receiving end, and some packets may be dropped or assigned a much lower priority without important information loss at the receiving end.

It is recognized that a large IoT payload might include a fragment that contains very little or no useful information as well as a fragment that includes very useful information (for example, very useful information such as header information or a vital decision output). In such a situation, it may not be advantageous to expend the same amount of effort, resource, focus, priority, etc. conveying the two fragments (for example, conveying the two fragments between IoT devices). In fact, in some embodiments, a different amount of prioritization can be made for different fragments (or different data blocks, or different packets). In some embodiments, an automatic judicious weighting or prioritization of data blocks and packets can be implemented for IoT networks and devices such as fog and edge devices and networks. This weighting or prioritization can be implemented without any human intervention. In some embodiments, a prioritization system can determine which packets (or fragments) to essentially drop or curtail efforts in order to convey to destination nodes if the perceived information value for that packet (or fragment) if the perceived information value is too low.

Some embodiments relate to dynamic prioritization of data blocks (or data or packets, or fragments) using dynamic weighting to enable a priority level adjustment based on the application or service context and information value. For example, in some embodiments, first and last packets (or data blocks, or fragments) of a JPEG image payload can be assigned increased priority due to image header and footer bytes contained therein. In some embodiments, important sensor information or machine imaging system information may be included in the payload, and some of the information in those data payloads may be more important than other information. For example, in some embodiments, certain portions of an image or other sensor information may be more important than others, and the important areas or information can be prioritized over the less important sensor areas or information. For example, if an IoT device is sensing temperature or pressure changes and the temperature or pressure does not change very much, the information may not be as important as when the temperature or pressure changes to a greater extent. In those embodiments, some changes can be prioritized and others can be de-prioritized or even ignored so that packets can be smaller or completely dropped. In an embodiment where an IoT device is sending images over long distances, for example, a very large number of transmissions (for example, 600 or more transmissions) may be required to send the complete image. In some embodiments, judicious weighting can be implemented on payload fragments so that less data can be sent, or based on the weighting approach, the device may not attempt to retry transmission in the case of lost fragments that are seen as being less important than others (or worthless). This can help save energy and battery power, for example.

In some embodiments, raw data that needs to be conveyed within a network such as an IoT network as well as associated energy costs can be reduced without adversely affecting information content. By reducing the amount of raw data that needs to be conveyed (or transmitted), network capacity usage may be improved. This can be accomplished by reducing network congestion and increasing information flow.

FIGS. 1-4 include example operating environments such as Internet of Things (IoT) environments which may utilize principles described herein. The example operating environments of FIGS. 1-4 may utilize principles described herein of data block prioritization (or packet prioritization) in an IoT network (for example, for IoT devices, fog devices, fog networks, edge devices, edge networks, foglets, etc.) as illustrated in FIGS. 5-12 and described in reference thereto.

The Internet of Things (IoT) is a system in which a large number of computing devices are interconnected to each other and to a communications network (e.g., the Internet) to provide a functionality, such as data acquisition and actuation, at very low levels in networks. Low levels indicate devices that may be located at or near the edges of networks, such as the last devices before the networks end. As used herein, an IoT device may include a device performing a function, such as sensing or control, among others, in communication with other IoT devices and a communications network. The IoT device may include an autonomous device or a semiautonomous device configured to perform one or more functions. Often, IoT devices can be limited in memory, size, or functionality, allowing larger numbers to be deployed for a similar cost to a smaller number of larger devices. However, an IoT device may be a smart phone, laptop, tablet, PC, and/or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home devices, such as water distribution systems, electric power distribution systems, pipeline control systems, plant control systems, light switches, thermostats, locks, cameras, alarms, motion sensors, and the like. The IoT devices may be accessible through a controller, such as computers, servers, and other systems, for example, to control systems or access data. The controller and the IoT devices can be remotely located from one another.

The Internet can be configured to provide communications to a large number of IoT devices. Accordingly, as described herein, a number of innovations for the future Internet are designed to address the need for network layers, from central servers, through gateways, down to edge devices, to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity including a combination of wired and wireless technologies as depicted in FIGS. 1 and 2.

Figure 2:
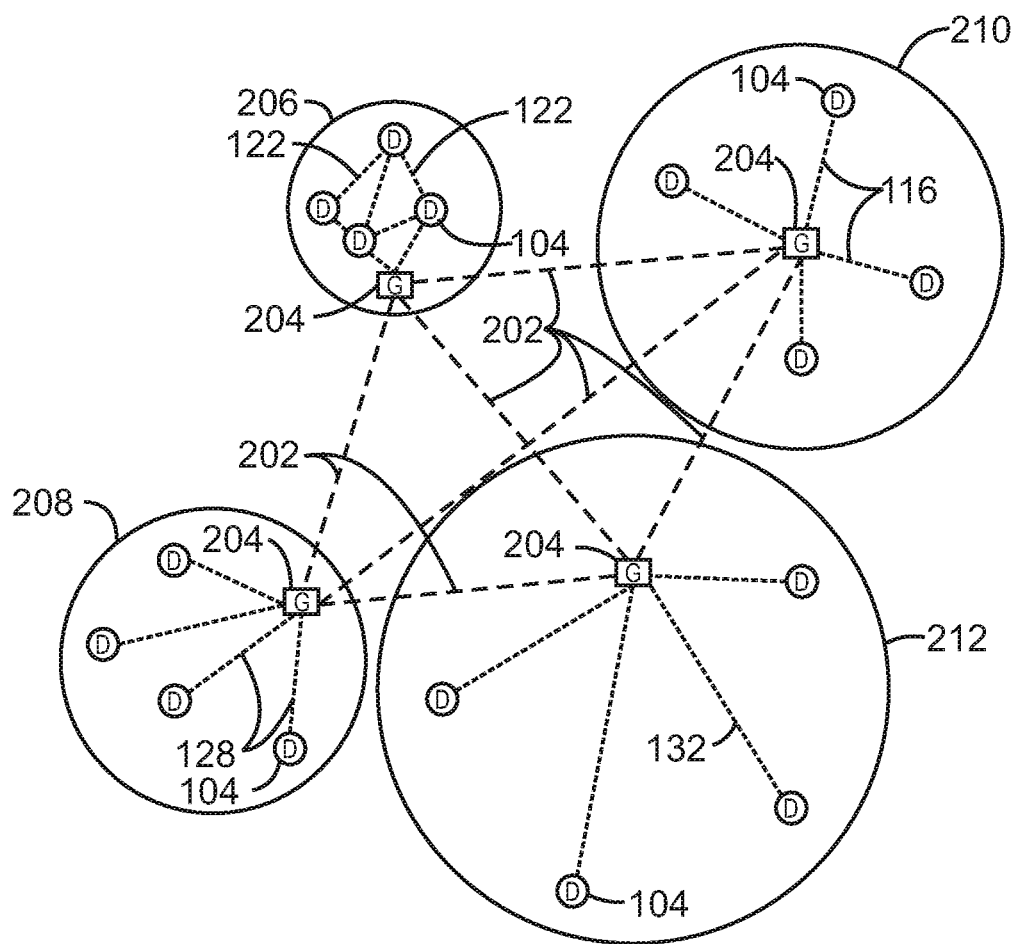
FIG. 2 illustrates a network topology for a number of internet-of-things (IoT) networks coupled through backbone links to gateways in accordance with some embodiments.

FIG. 1 is a drawing of interconnections that may be present between the Internet 100 and IoT networks in accordance with some embodiments. The interconnections may couple smaller networks 102, down to the individual IoT device 104, to the backbone 106 of the Internet 100. To simplify the drawing, not every device 104, or other object, is labeled.

In FIG. 1, top-level providers, which may be termed tier 1 ("T1") providers 108, are coupled by the backbone 106 of the Internet to other providers, such as secondary or tier 2 ("T2") providers 110. In some aspects, the backbone 106 can include optical fiber links. In one example, a T2 provider 110 may couple to a tower 112 of an LTE cellular network, for example, by further links, by microwave communications 114, or by other communications technologies. The tower 112 may couple to a mesh network including IoT devices 104 through an LTE communication link 116, for example, through a central node 118. The communications between the individual IoT devices 104 may also be based on LTE communication links 116.

In another example, a high-speed uplink 119 may couple a T2 provider 110 to a gateway 120. A number of IoT devices 104 may communicate with the gateway 120, and with each other through the gateway 120, for example, over Bluetooth low energy (BLE) links 122.

The backbone 106 may couple lower levels of service providers to the Internet, such as tier 3 ("T3") providers 124. A T3 provider 124 may be considered a general Internet service provider (ISP), for example, purchasing access to the backbone 106 from a T2 provider 110 and providing access to a corporate gateway 126 and other customers.

From the corporate gateway 126, a wireless local area network (WLAN) can be used to communicate with IoT devices 104 through Wi-Fi® links 128. A Wi-Fi link 128 may also be used to couple to a low power wide area (LPWA) gateway 130, which can communicate with IoT devices 104 over LPWA links 132, for example, compatible with the LoRaWAN specification promulgated by the LoRa Alliance.

The T3 provider 124 may also provide access to a mesh network 134 through a coordinator device 136 that communicates with the T3 provider 124 using any number of communications links, such as an LTE cellular link, an LPWA link, or a link 138 based on the IEEE 802.15.4 standard, such as Zigbee®. Other coordinator devices 136 may provide a chain of links that forms one or more cluster tree of linked devices.

In some aspects, one or more IoT devices 104 include the appropriate transceiver for the communications with other devices. Further, one or more IoT devices 104 may include other radio, optical, or acoustic transceivers, as well as wired network interfaces, for communications using additional protocols and frequencies. In some aspects, one or more IoT devices 104 includes components described in regard to FIG. 11.

The technologies and networks may enable the growth of devices and networks. As the technologies grow, the network may be developed for self-management, functional evolution, and/or collaboration, without needing direct human intervention. Thus, the technologies may enable networks to function without centralized controlled systems. The technologies described herein may automate the network management and operation functions beyond current capabilities. Further, the approaches may provide the flexibility to have a centralized control operating without human intervention, a centralized control that is automated, or any combinations thereof.

FIG. 2 is a drawing of a network topology 200 that may be used for a number of internet-of-things (IoT) networks coupled through backbone links 202 to gateways 204 in accordance with some embodiments. Like numbered items are as described with respect to FIG. 1. Further, to simplify the drawing, not every device 104, or communications link 116, 122, 128, or 132 is labeled. The backbone links 202 may include any number of wired or wireless technologies, and may be part of a local area network (LAN), a wide area network (WAN), or the Internet.

Although the topologies in FIG. 2 are hub-and-spoke and the topologies in FIG. 1 are peer-to-peer, it may be observed that these are not in conflict, but that peer-to-peer nodes may behave as hub-and-spoke through gateways. It may also be observed in FIG. 2 that a sub-net topology may have multiple gateways, rendering it a hybrid topology rather than a purely hub-and-spoke topology (or rather than a strictly hub-and-spoke topology).

The network topology 200 may include any number of types of IoT networks, such as a mesh network 206 using Bluetooth Low Energy (BLE) links 122. Other IoT networks that may be present include a WLAN network 208, a cellular network 210, and an LPWA network 212. Each of these IoT networks may provide opportunities for new developments, as described herein.

For example, communications between IoT devices 104, such as over the backbone links 202, may be protected by a decentralized system for authentication, authorization, and accounting (AAA). In a decentralized AAA system, distributed payment, credit, audit, authorization, brokering, arbitration, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, and vibration, into the autonomous organizations. The integration of sensory systems may allow systematic and autonomous communication and coordination of service delivery against contractual service objectives, orchestration and quality of service (QoS) based swarming and fusion of resources.

The mesh network 206 may be enhanced by systems that perform inline data-to-information transforms. For example, self-forming chains of processing resources comprising a multi-link network may distribute the transformation of raw data to information in an efficient manner. This may allow such functionality as a first stage performing a first numerical operation, before passing the result to another stage, the next stage then performing another numerical operation, and passing that result on to another stage. The system may provide the ability to differentiate between assets and resources and the associated management of each. Furthermore, the proper components of infrastructure and resource based trust and service indices may be inserted to improve the data integrity, quality assurance, and deliver a metric of data confidence.

As described herein, the WLAN network 208 may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 210 may be enhanced by systems that offload data, extend communications to more remote devices, or both. The LPWA network 212 may include systems that perform non-Internet protocol (IP) to IP interconnections, addressing, and routing.

Figure 3:
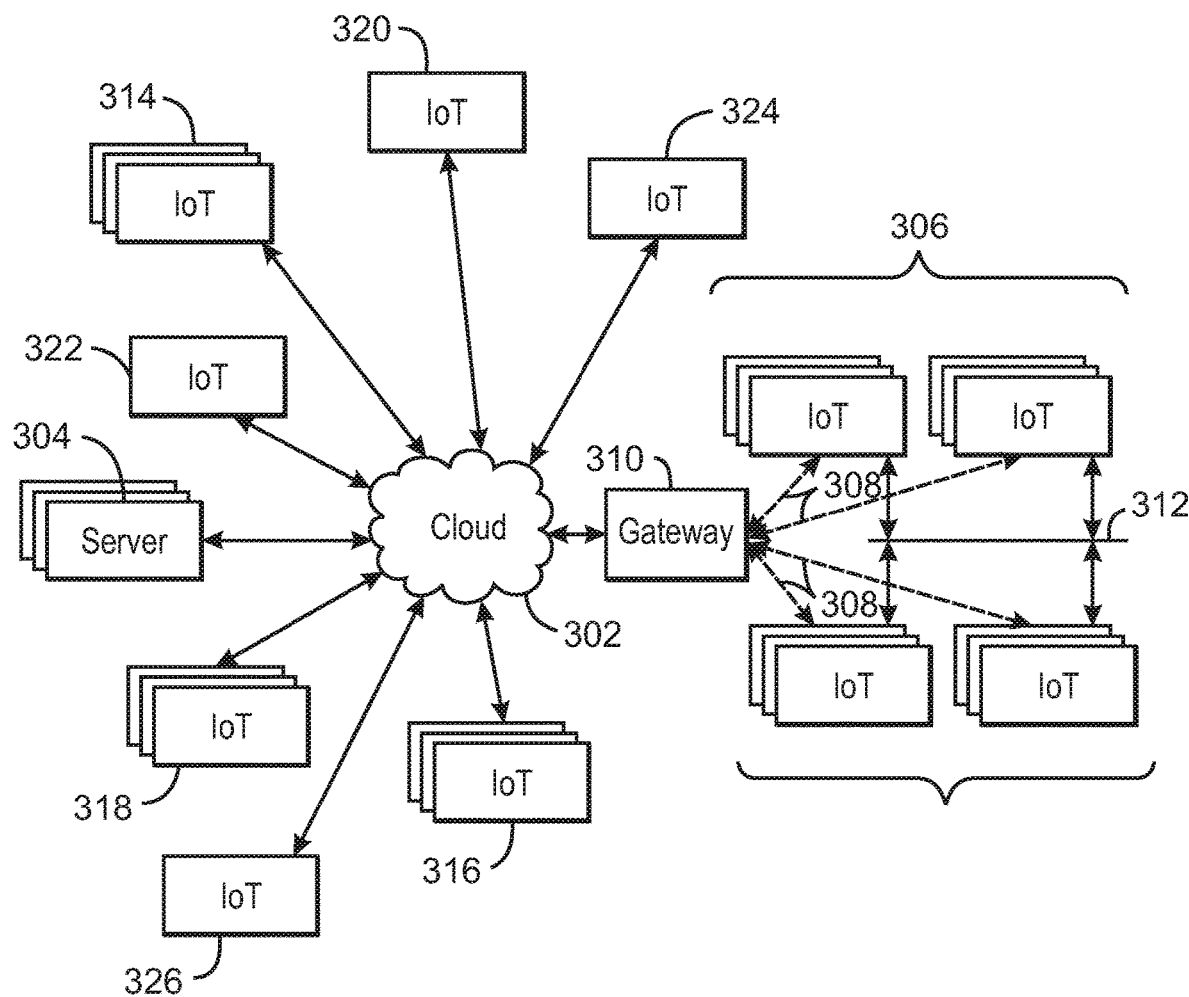
FIG. 3 illustrates a cloud computing network, or cloud, in communication with a number of IoT devices in accordance with some embodiments.

FIG. 3 is a drawing 300 of a cloud computing network, or cloud 302, in communication with a number of Internet of Things (IoT) devices in accordance with some embodiments. The cloud 302 may represent the Internet, or may be a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include stoplights, traffic flow monitors, cameras, weather sensors, and the like. The traffic control group 306, or other subgroups, may be in communication with the cloud 302 through wireless links 308, such as LPWA links, and the like. Further, a wired or wireless sub-network 312 may allow the IoT devices to communicate with each other, such as through a local area network, a wireless local area network, and the like. The IoT devices may use another device, such as a gateway 310 to communicate with the cloud 302.

Other groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, or both.

As can be seen from FIG. 3, a large number of IoT devices may be communicating through the cloud 302. This may allow different IoT devices to request or provide information to other devices autonomously. For example, the traffic control group 306 may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

Clusters of IoT devices, such as the remote weather stations 314 or the traffic control group 306, may be equipped to communicate with other IoT devices as well as with the cloud 302. This may allow the IoT devices to form an ad-hoc network between the devices, allowing them to function as a single device, which may be termed a fog device. The fog device is discussed further with respect to FIG. 4.

Figure 4:
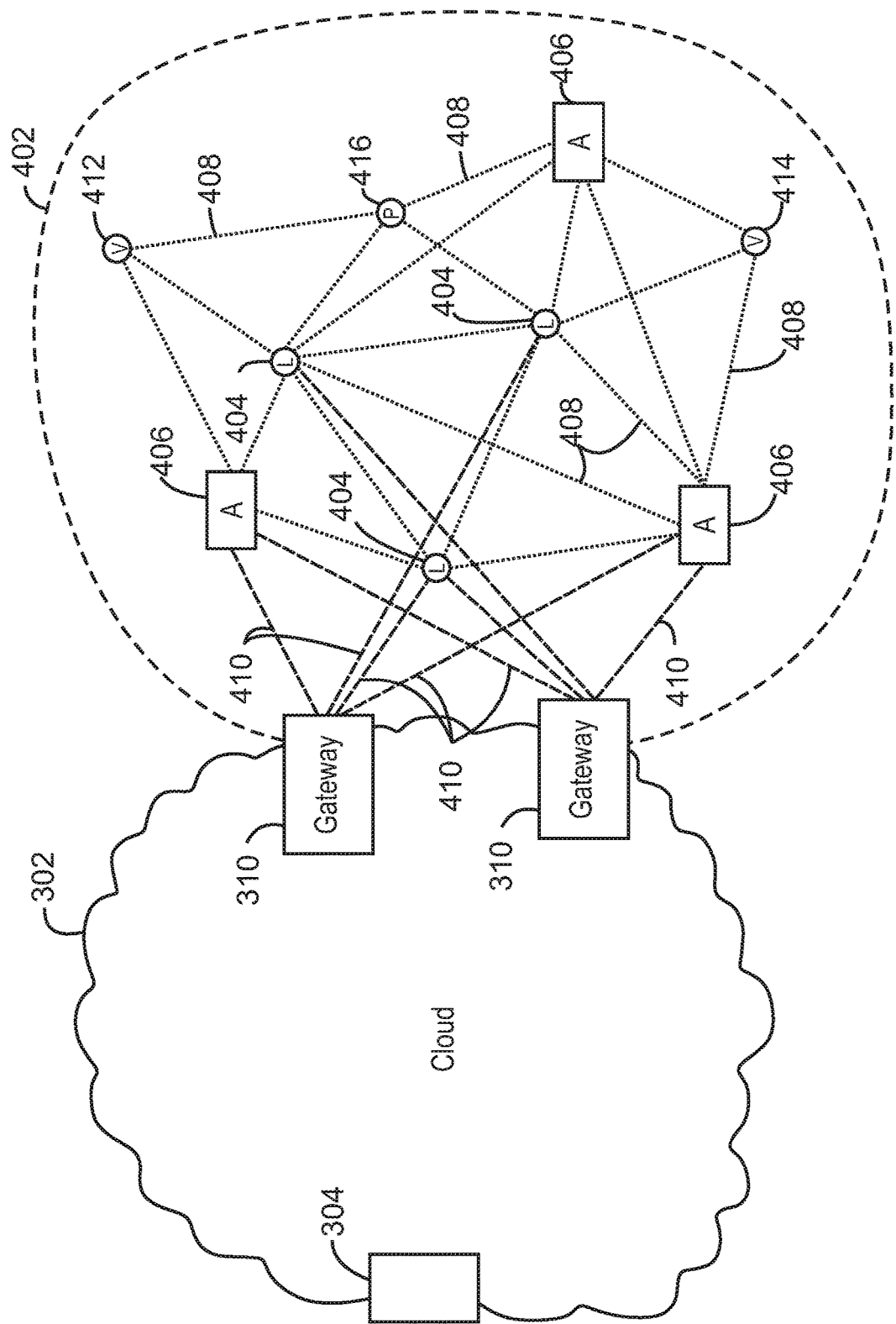
FIG. 4 illustrates a cloud computing network, or cloud, in communication with a mesh network of IoT devices, which may be termed a fog device, operating at the edge of the cloud in accordance with some embodiments.

FIG. 4 is a drawing 400 of a cloud computing network, or cloud 302, in communication with a mesh network of IoT devices, which may be termed a fog device 402, operating at the edge of the cloud 302 in accordance with some embodiments. Like numbered items are as described with respect to FIG. 3. As used herein, a fog device 402 is a cluster of devices that may be grouped to perform a specific function, such as traffic control, weather control, plant control, and the like.

In this example, the fog device 402 includes a group of IoT devices at a traffic intersection. The fog device 402 may be established in accordance with specifications released by the OpenFog Consortium (OFC), among others. These specifications allow the formation of a hierarchy of computing elements between the gateways 310 coupling the fog device 402 to the cloud 302 and to endpoint devices, such as traffic lights 404 and data aggregators 406 in this example. The fog device 402 can leverage the combined processing and network resources that the collective of IoT devices provides. Accordingly, a fog device 402 may be used for any number of applications including, for example, financial modeling, weather forecasting, seismic measurement, traffic analyses, security monitoring, and the like.

For example, traffic flow through the intersection may be controlled by a plurality of traffic lights 404 (e.g., three traffic lights 404). Analysis of the traffic flow and control schemes may be implemented by aggregators 406 that are in communication with the traffic lights 404 and each other through a mesh network. Data may be uploaded to the cloud 302, and commands received from the cloud 302, through gateways 310 that are in communication with the traffic lights 404 and the aggregators 406 through the mesh network.

Any number of communications links may be used in the fog device 402. Shorter-range links 408, for example, compatible with IEEE 802.15.4 may provide local communications between IoT devices that are proximate to the intersection. Longer-range links 410, for example, compatible with LPWA standards, may provide communications between the IoT devices and the gateways 310. To simplify the diagram, not every communication link 408 or 410 is labeled with a reference number.

The fog device 402 may be considered to be a massively interconnected network wherein a number of IoT devices are in communications with each other, for example, by the communication links 408 and 410. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection and interoperability protocols may also be used, including, for example, the Open Platform Communications (OPC) Unified Architecture released in 2008 by the OPC Foundation, the AllJoyn protocol from the AllSeen alliance, the optimized link state routing (OLSR) Protocol, or the better approach to mobile ad-hoc networking (B.A.T.M.A.N.), among many others.

In some aspects, communications from one IoT device may be passed along the most convenient path to reach the gateways 310, for example, the path having the fewest number of intermediate hops, or the highest bandwidth, among others. In these networks, the number of interconnections provide substantial redundancy, allowing communications to be maintained, even with the loss of a number of IoT devices.

In some aspects, the fog device 402 can include temporary IoT devices. In other words, not all of the IoT devices may be permanent members of the fog device 402. For example, in the exemplary system 400, three transient IoT devices have joined the fog device 402, a first vehicle 412, a second vehicle 414, and a pedestrian 416. In these cases, the IoT device may be built into the vehicles 412 and 414, or may be an app on a smart phone carried by the pedestrian 416. Other IoT devices may also be present, such as IoT devices in bicycle computers, motorcycle computers, drones, and the like.

The fog device 402 formed from the IoT devices may be presented to clients in the cloud 302, such as the server 304, as a single device located at the edge of the cloud 302. In this example, the control communications to specific resources in the fog device 402 may occur without identifying any specific IoT device within the fog device 402. Accordingly, if one IoT device within the fog device 402 fails, other IoT devices in the fog device 402 may be able to discover and control a resource, such as an actuator, or other device attached to an IoT device. For example, the traffic lights 404 may be wired so as to allow any one of the traffic lights 404 to control lights for the other traffic lights 404. The aggregators 406 may also provide redundancy in the control of the traffic lights 404 and other functions of the fog device 402.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures. This may be performed as transient IoT devices, such as the pedestrian 416, join the fog device 402.

As the pedestrian 416 is likely to travel more slowly than the vehicles 412 and 414, the fog device 402 may reconfigure itself to ensure that the pedestrian 416 has sufficient time to make it through the intersection. This may be performed by forming a temporary group of the vehicles 412 and 414 and the pedestrian 416 to control the traffic lights 404. If one or both of the vehicles 412 or 414 are autonomous, the temporary group may instruct the vehicles to slow down prior to the traffic lights 404. Further, if all of the vehicles at the intersection are autonomous, the need for traffic signals may be diminished since autonomous vehicles' collision avoidance systems may allow for highly inter-leaved traffic patterns that may be too complex for traffic lights to manage. However, traffic lights 404 may still be important for the pedestrian 416, cyclists, or non-autonomous vehicles.

As the transient devices 412, 414, and 416, leave the vicinity of the intersection of the fog device 402, the fog device 402 may reconfigure itself to eliminate those IoT devices from the network. As other transient IoT devices approach the intersection, the fog device 402 may reconfigure itself to include those devices.

The fog device 402 may include the traffic lights 404 for a number of intersections, such as along a street, along with all of the transient IoT devices along the street. The fog device 402 may then divide itself into functional units, such as the traffic lights 404 and other IoT devices proximate to a single intersection. This type of combination may enable the formation of larger IoT constructs, e.g., groups of IoT devices that perform a particular function, in the fog device 402.

For example, if an emergency vehicle joins the fog device 402, an emergency construct, or virtual device, may be created that includes all of the traffic lights 404 for the street, allowing control of the traffic flow patterns for the entire street. The emergency construct may instruct the traffic lights 404 along the street to stay red for opposing traffic and green for the emergency vehicle, expediting the passage of the emergency vehicle.

As illustrated by the fog device 402, the organic evolution of IoT networks is central to improving or maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Networks of devices may be provided in a multi-access edge computing (MEC) environment. Multi-access edge computing (MEC), also referred to as mobile edge computing, may offer application developers and content providers cloud-computing capabilities and an information technology service environment at the edge of a network. An MEC system may include an MEC orchestrator, and an MEC platform manager, which manage the provision of a service to a user equipment (UE) device, by a service provider, through one or more access points, or one or more MEC hosts.

The MEC environment may be part of a radio access network (RAN) that has been opened to third party providers, such as clearing houses for blockchain transactions. The RAN may provide a high bandwidth, low latency system that allows fog devices 402 to function more efficiently with applications and services in the cloud 302. Accordingly, MEC 302 may be seen as a cloud or fog server running at the edge of a mobile network and performing tasks that may not be achieved with traditional network infrastructure. Machine-to-Machine gateway and control functions, such as the IoT device examples described with respect to FIGS. 3 and 4, are one example. In an MEC network, processing power, such as servers, are moved closer to the edge of networks. For example, the aggregators 406 located within the fog device 402.

Figure 5:
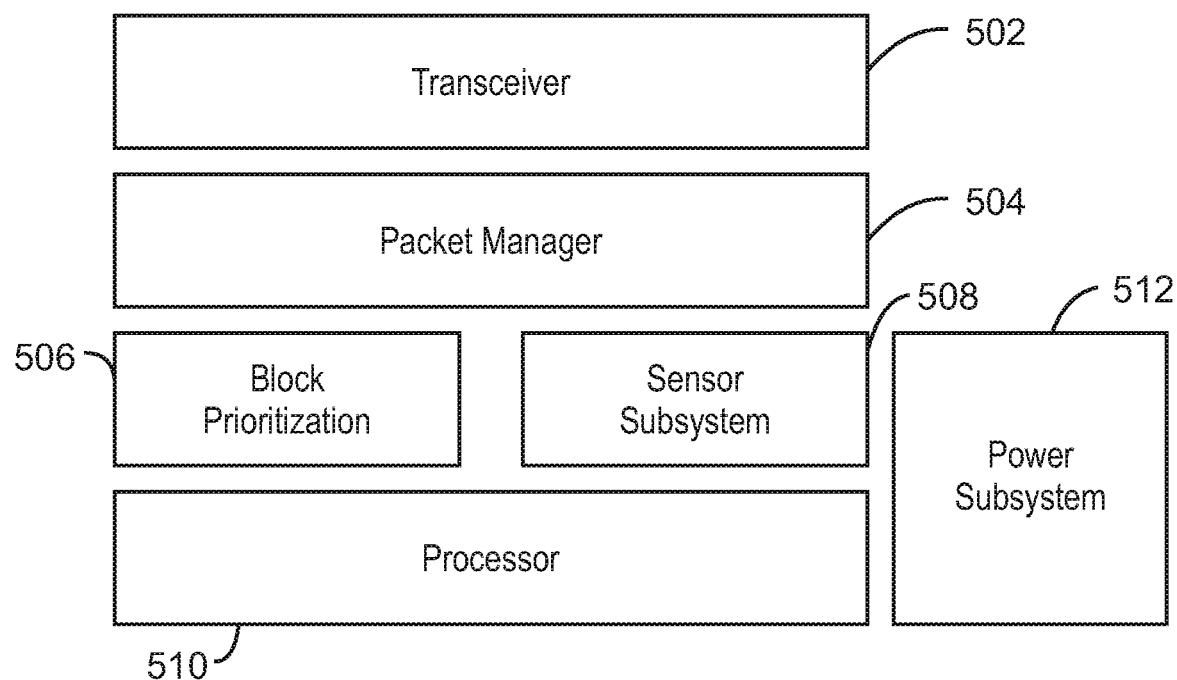
FIG. 5 illustrates an IoT system including data prioritization in accordance with some embodiments.

FIG. 5 illustrates a system 500 including data block prioritization in accordance with some embodiments. In some embodiments, system 500 is one or more of a system, a node, a device, an IoT system, an IoT node, an IoT device, an edge system, an edge node, an edge device, a fog system, a fog node, or a fog device, among others. System 500 includes a transceiver 502, a packet manager 504, block prioritization 506, a sensor subsystem 508, a processor 510, and a power subsystem 512.

The block prioritization subsystem 506 can be communicatively situated between an incoming data path (for example, sensor subsystem 508) and a packet manager such as packet manager 504 (for example, a packet manager in an edge node or a fog node). In some embodiments, block prioritization subsystem 506 can implement a packet weighting process. For example, a packet (or fragment, or block) containing header information can be weighted by block prioritization subsystem 506 at a high priority weighting and a mid-frame packet without header information and containing loss-tolerant information can be weighted by block prioritization subsystem 506 at a lower priority weighting. In some embodiments, block prioritization subsystem 506 can implement a dynamic prioritization of packets, fragments, or data blocks using dynamic weighting. The dynamic weighting can enable per-packet priority level adjustment. The per-packet priority level adjustment can be based on, for example, the application (or service) context and information value. For example, in some embodiments, block prioritization subsystem 506 can assign first and last packets (or fragments, or data blocks) of a JPEG image payload with an increased priority due to image header and footer bytes contained therein.

Figure 6:
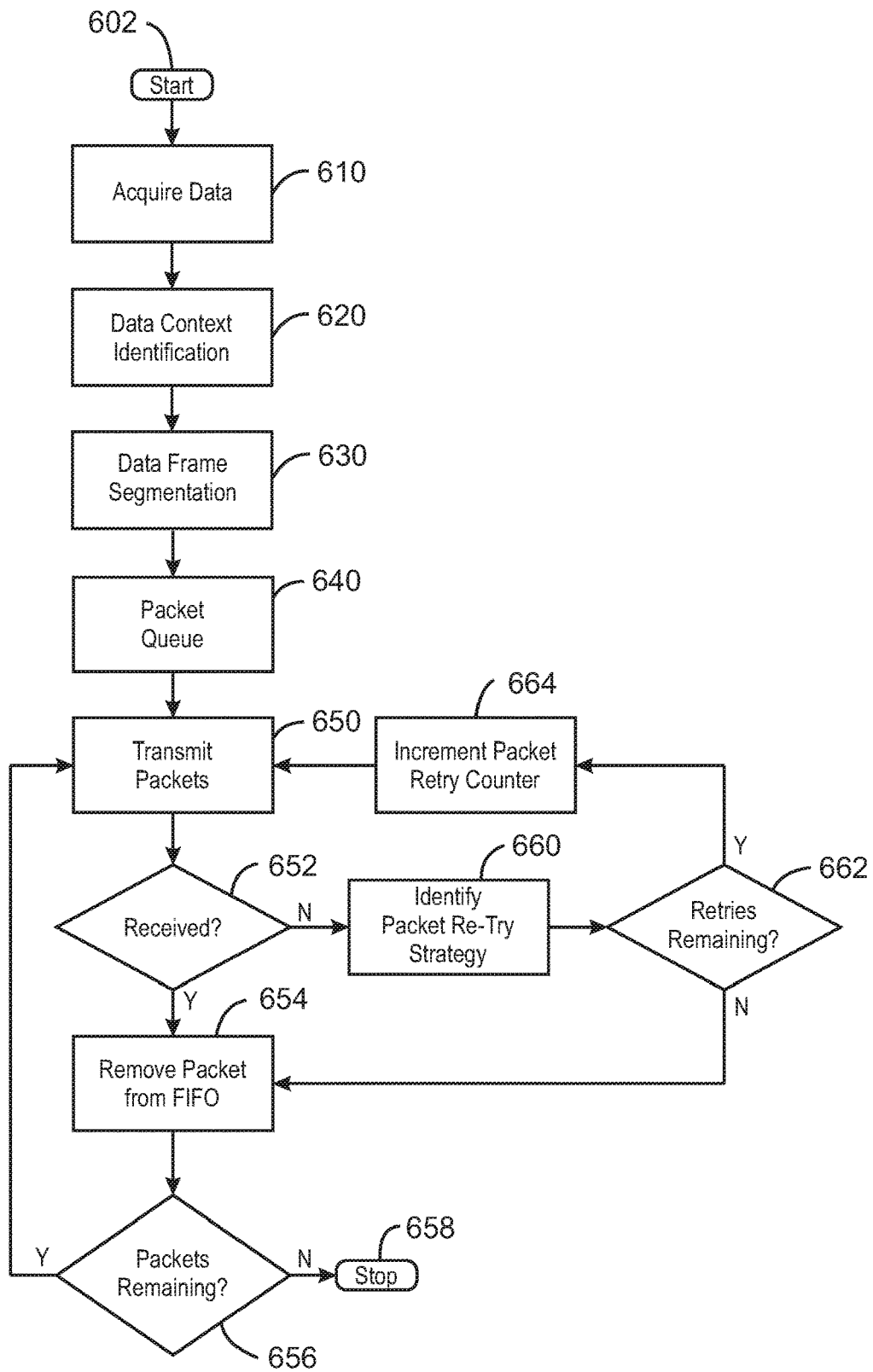
FIG. 6 illustrates data prioritization in accordance with some embodiments.

FIG. 6 illustrates data block prioritization 600 in accordance with some embodiments. In some embodiments, data block prioritization 600 can include one or more of packet prioritization or fragment prioritization, for example. In some embodiments, data block prioritization 600 can be implemented using any of the features, devices, systems, techniques, etc. illustrated or described herein. In some embodiments, for example, data block prioritization 600 can be implemented by block prioritization subsystem 506 of FIG. 5, IoT device 1100 of FIG. 11, or processor 1202 of FIG. 12 executing instructions stored on machine readable medium 1200, for example.

Prioritization 600 begins at start 602. Data are acquired from one or more sources at block 610. For example, in some embodiments, a data frame or image data are captured at 610. Also, an initial source of data can be identified at 610 from frame information such as, for example, a JPEG header, an industrial sensor control frame, etc., among others.

Data context is identified at 620. For example, for complex data types, a weighting set can be generated based on the context (for example, if the message is one or more of a routine message, an unscheduled report due to a triggered event, a message of higher priority due to being a recent report from a field device, etc., among others). At 630, data frame segmentation is implemented. Weighting set templates can also be selected based on an information type derived from basic packet (or block) identifiers. For example, weighting set A might apply to payload types where a highest weighting level is applied to header and footer byte segments, and a lowest weighting level is applied to repeated sequences within the payload where their loss would not adversely affect information value of the resultant payload.

Packets are queued at 640. For example, in time sensitive networks, higher priority packets/blocks can be placed at the front of the queue. In some embodiments, this can be implemented in a flexible manner, and the queuing process need not be limited to a single queuing strategy. For example, in some embodiments, queuing can be based on one or more of size, priority, or time value, among others.

Packets are transmitted at 650. If packets are received at 652, one or more packet is removed from a buffer (for example, removed from a first in first out buffer or FIFO buffer) at 654. Then a determination is made at 656 as to whether packets are remaining. If packets are remaining at 656, flow moves to box 650 where packets are transmitted. If packets are not remaining at 656, all packets have been handled. Flow then moves to stop prioritization 600 at 658, or alternatively in some embodiments return flow to data acquisition box 610.

If packets are not received at 652, a packet re-try strategy is identified at box 660. In some embodiments, for example, packet re-try is less necessary and de-prioritized for packets/fragments that are determined to be of lesser priority than other packets, and the prioritization may not even re-try certain packets/fragments. In some embodiments, data/packets/fragments with low priority weighting are re-tried less than data/packets/fragments with higher priority weighting. Then a decision is made at 662 as to whether any retries are remaining. If re-tries are remaining at 662, flow moves to box 664, where a packet retry counter is incremented, and packets are transmitted at 650. If re-tries are not remaining at 662, one or more packet is removed from a buffer (for example, removed from a first in first out buffer or FIFO buffer) at 654. Then a determination is made at 656 as to whether packets are remaining. If packets are remaining at 656, flow moves to box 650 where packets are transmitted. If packets are not remaining at 656, all packets have been handled. Flow then moves to stop prioritization 600 at 658, or alternatively in some embodiments return flow to data acquisition box 610.

In some embodiments, 650, 652, 654, 656, 660, 662 and 664 of prioritization 600 can be included in packet transmission and reception monitoring. In some embodiments, packet transmission and reception monitoring can use packet/block information to dynamically change how each packet is treated. For example, in some embodiments, a number N retries might be attempted for one or more header byte packets, while requiring an acknowledged receipt. In some embodiments, 0 retries might be attempted for a mid-frame packet with a low information value. In some embodiments, instead of using a blanket packet handling strategy packet handling can be implemented on a per-packet basis.

Figure 7:
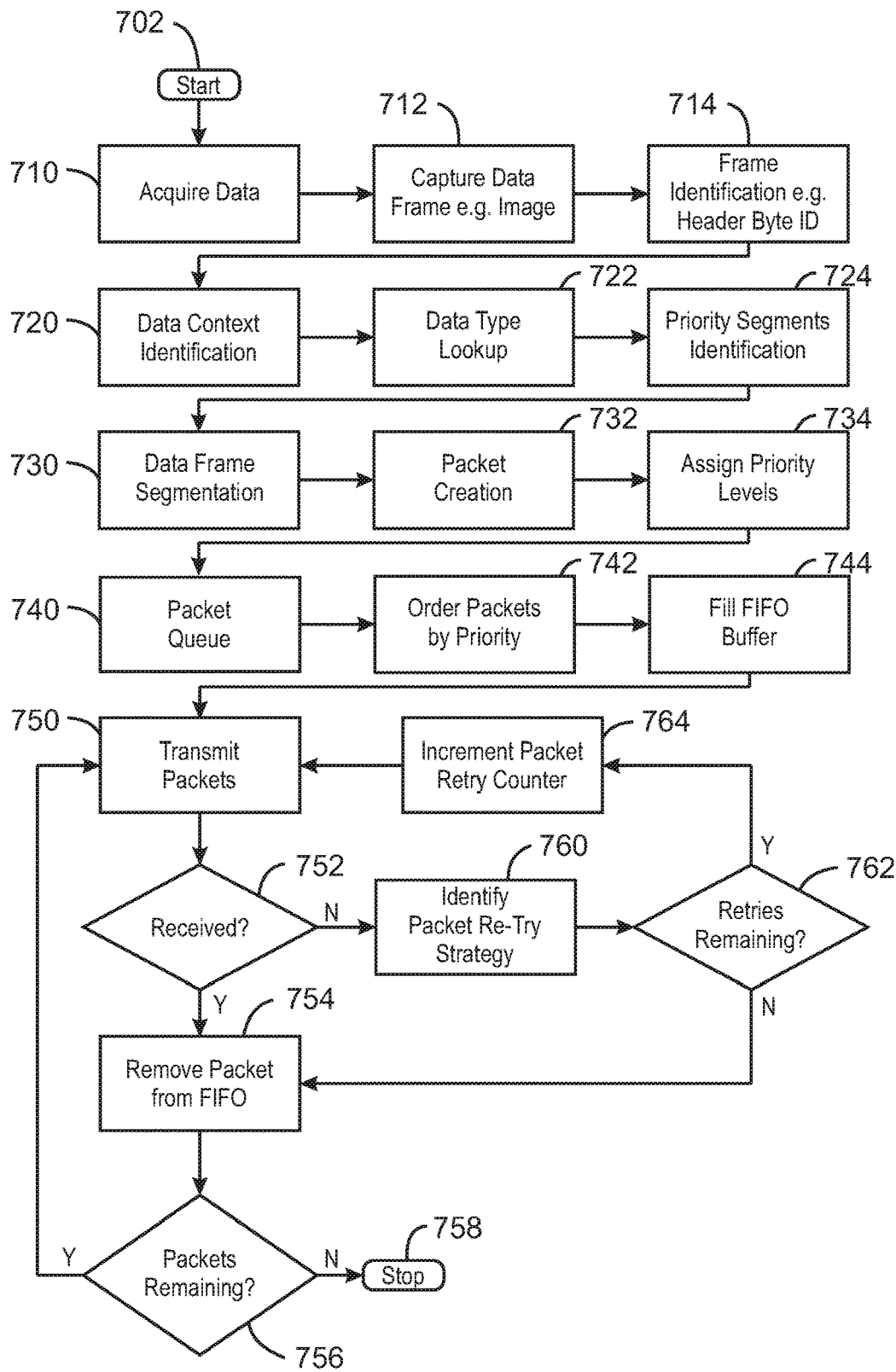
FIG. 7 illustrates data prioritization in accordance with some embodiments.

FIG. 7 illustrates data block prioritization 700 in accordance with some embodiments. In some embodiments, data block prioritization 700 can include one or more of packet prioritization or fragment prioritization, for example. In some embodiments, data block prioritization 700 can be implemented using any of the features, devices, systems, techniques, etc. illustrated or described herein. In some embodiments, for example, data block prioritization 700 can be implemented by block prioritization subsystem 506 of FIG. 5, IoT device 1100 of FIG. 11, or processor 1202 of FIG. 12 executing instructions stored on machine readable medium 1200, for example.

Prioritization 700 begins at start 702. Data are acquired from one or more sources at block 710. For example, in some embodiments, a data frame or image data are captured at 710. Also, an initial source of data can be identified at 710 from frame information such as, for example, a JPEG header, an industrial sensor control frame, etc., among others. For example, at 712 a data frame (for example, image data) is captured. Frame identification is performed at 714 (for example, using a header byte ID).

Data context is identified at 720. For example, for complex data types, a weighting set can be generated based on the context (for example, if the message is one or more of a routine message, an unscheduled report due to a triggered event, a message of higher priority due to being a recent report from a field device, etc., among others). A data type lookup is performed at 722, and priority segments are identified at 724. At 730, data frame segmentation is implemented. Weighting set templates can also be selected based on an information type derived from basic packet (or block) identifiers. For example, weighting set A might apply to payload types where a highest weighting level is applied to header and footer byte segments, and a lowest weighting level is applied to repeated sequences within the payload where their loss would not adversely affect information value of the resultant payload. Packet creation can be implemented at 732 and priority levels can be assigned at 734.

Packets are queued at 740. For example, in time sensitive networks, higher priority packets/blocks can be placed at the front of the queue. In some embodiments, this can be implemented in a flexible manner, and the queuing process need not be limited to a single queuing strategy. For example, in some embodiments, queuing can be based on one or more of size, priority, or time value, among others. Packets may be ordered by the queuing strategy (for example, by priority) at 742. A FIFO buffer can be filled at 744 (for example, with the packets ordered by priority at 742).

Packets are transmitted at 750. If packets are received at 752, one or more packet is removed from a buffer (for example, removed from a first in first out buffer or FIFO buffer) at 754. Then a determination is made at 756 as to whether packets are remaining. If packets are remaining at 756, flow moves to box 750 where packets are transmitted. If packets are not remaining at 756, all packets have been handled. Flow then moves to stop prioritization 700 at 758, or alternatively in some embodiments return flow to data acquisition box 710.

If packets are not received at 752, a packet re-try strategy is identified at box 760. In some embodiments, for example, packet re-try is less necessary and de-prioritized for packets/fragments that are determined to be of lesser priority than other packets, and the prioritization may not even re-try certain packets/fragments. In some embodiments, data/packets/fragments with low priority weighting are re-tried less than data/packets/fragments with higher priority weighting. Then a decision is made at 762 as to whether any retries are remaining. If re-tries are remaining at 762, flow moves to box 764, where a packet retry counter is incremented, and packets are transmitted at 750. If re-tries are not remaining at 762, one or more packet is removed from a buffer (for example, removed from a first in first out buffer or FIFO buffer) at 754. Then a determination is made at 756 as to whether packets are remaining. If packets are remaining at 756, flow moves to box 750 where packets are transmitted. If packets are not remaining at 756, all packets have been handled. Flow then moves to stop prioritization 700 at 758, or alternatively in some embodiments return flow to data acquisition box 710.

In some embodiments, 750, 752, 754, 756, 760, 762, and 764 of prioritization 700 can be included in packet transmission and reception monitoring. In some embodiments, packet transmission and reception monitoring can use packet/block information to dynamically change how each packet is treated. For example, in some embodiments, a number N retries might be attempted for one or more header byte packets, while requiring an acknowledged receipt. In some embodiments, 0 retries might be attempted for a mid-frame packet with a low information value. In some embodiments, instead of using a blanket packet handling strategy packet handling can be implemented on a per-packet basis.

In some embodiments, a block/packet weighting implementation can be dynamically generated. In some embodiments, a block/packet weighting implementation can be predetermined.

In some embodiments, packets or data blocks of a payload can be referred to as fragments. For example, in some embodiments, a weighting $W_i$ applied to an $i^{th}$ fragment of a payload of type X can be averaged over the number $F_C$ of fragments in the payload, where $P_x[i]$ is the payload value for the $i^{th}$ fragment. This can be represented in some embodiments by the following Equation 1:

$$W_i = P_x[i]/F_C \quad \text{(EQUATION 1)}$$

In some embodiments, a weighting $W_i$ applied to an $i^{th}$ fragment of a payload of type X can be a product of the payload value $P_x[i]$ for the $i^{th}$ fragment and a summation of a set of external information value metrics E (for example, N external information value metrics $E_0, E_1, \ldots, E_{N-1}$). These external information value metrics can be based in some embodiments on alarm conditions (for example, one or more of infrared detection, motion, or other security alarm conditions in a security implementation). This can be represented in some embodiments by the following Equation 2:

$$W_i = P_x[i]*(E_0+E_1+ \ldots +E_{N-1}) \quad \text{(EQUATION 2)}$$

In some embodiments, a weighting $W_i$ applied to an $i^{th}$ fragment of a payload of type X can be a product of the payload value $P_x[i]$ for the $i^{th}$ fragment and a summation of a set of two external information value metrics E (for example, N external information value metrics $E_0, E_1, \ldots, E_{N-1}$) and F (for example, N external information value metrics $F_0, F_1, \ldots, F_{N-1}$), where both E and F have individual priority level assignments (for example, $Z_0$ and $Z_1$). In some embodiments, $Z_0$ and $Z_1$ can be values between 0 and 1. For example, in some embodiments $Z_0$ can have a value of 1.0 and $Z_1$ can have a value of 0.5, and the set of external information metrics E would have twice the weighting factor compared with external information metrics F. In some embodiments, this approach can be extended to other combinations (for example, to increased combinations of internal and external information value metrics). In some embodiments, this can be represented by the following Equation 3:

$$W_i = P_x[i]*(Z_0(E_0+E_1+ \ldots +E_{N-1})+Z_1(F_0+F_1+ \ldots +F_{N-1})) \quad \text{(EQUATION 3)}$$

Figure 8:
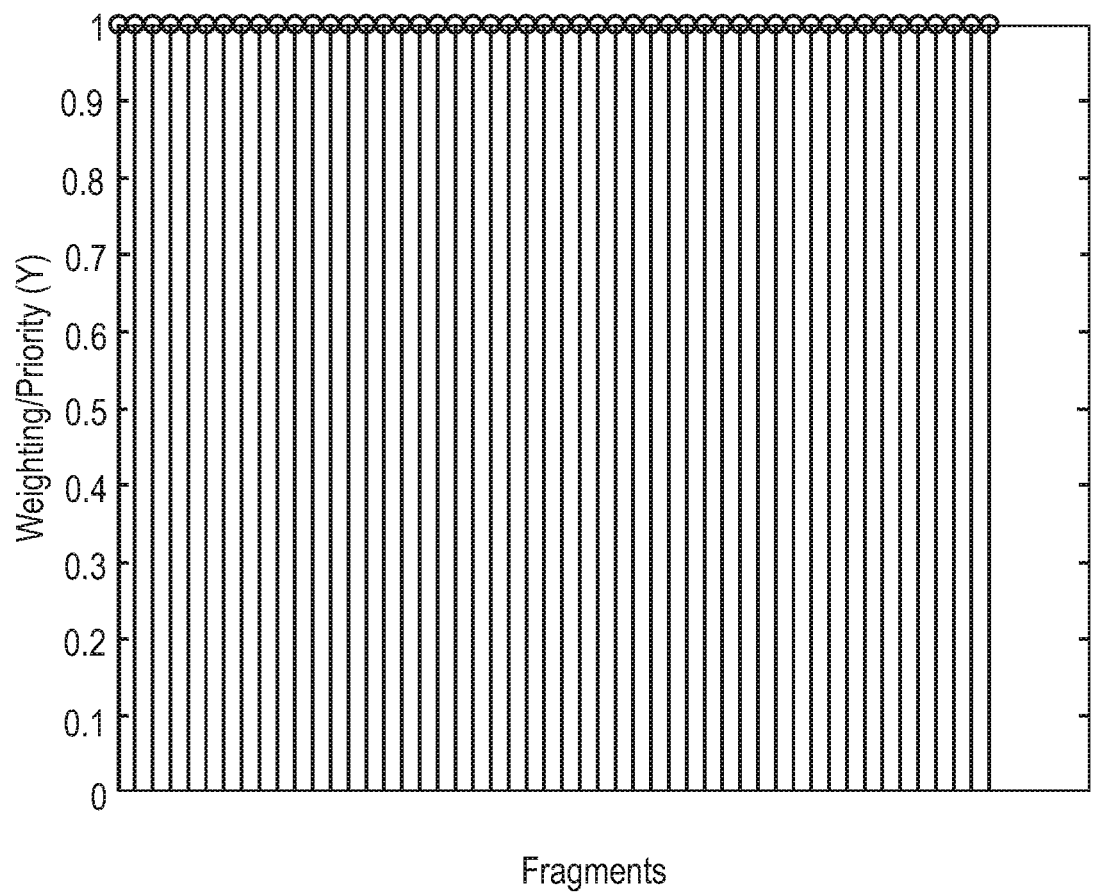
FIG. 8 illustrates data fragment priority weighting in accordance with some embodiments.

FIG. 8 illustrates data fragment priority weighting 800 in accordance with some embodiments. In weighting 800, each of a number of fragments of a payload are provided with an equal priority weighting (for example, an equal priority weighting Y of 1.0 throughout the fragments of the payload). In some embodiments, such an approach can be used with a payload representing an event with high information value. In some embodiments, for example, the fragments illustrated on the horizontal axis of weighting 800 can represent fragments in a payload corresponding to a new image or video sequence captured during an event representing high information value (for example, such as a security-triggered event). In such an embodiment, an equal weighting can be applied to all fragments in the payload. Such an equal weighting can be implemented with any of the techniques described herein (for example, by one or more of block prioritization subsystem 506 of FIG. 5, prioritization 600 of FIG. 6, prioritization 700 of FIG. 7, IoT device 1100 of FIG. 11, or processor 1202 of FIG. 12 executing instructions stored on machine readable medium 1200).

Figure 9:
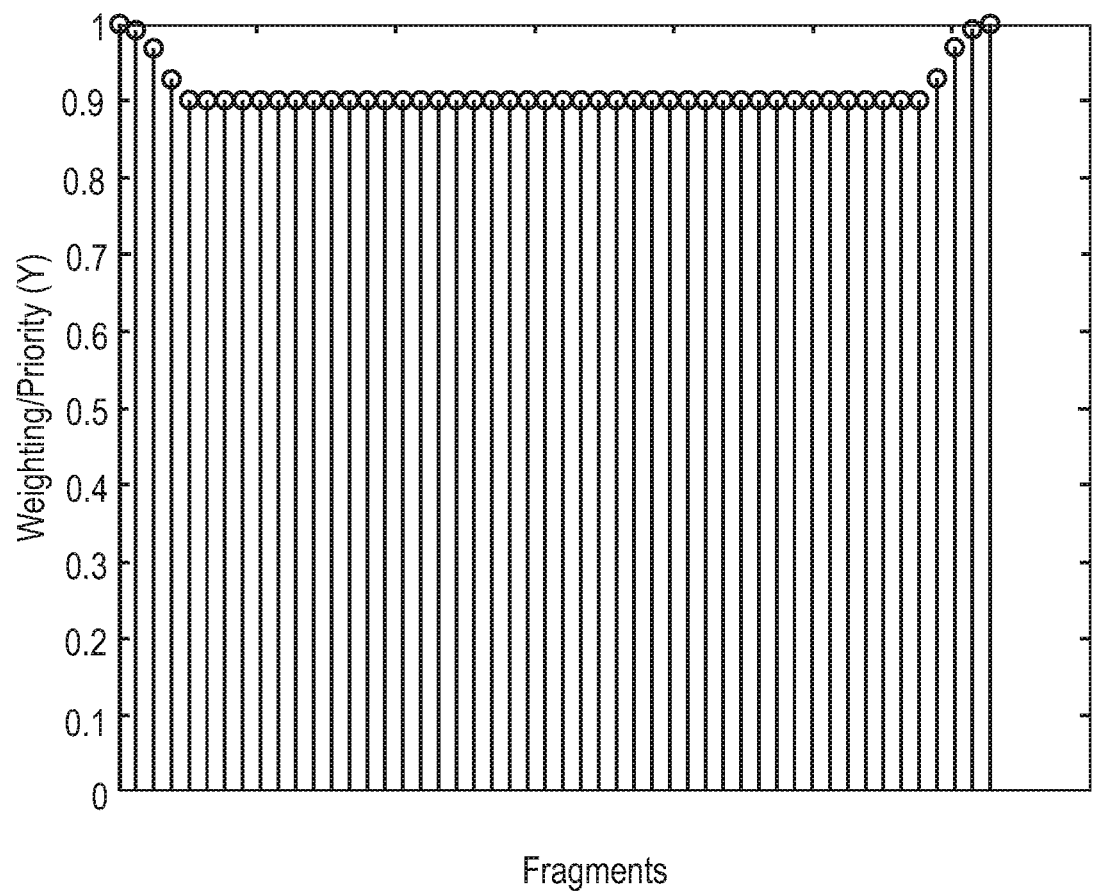
FIG. 9 illustrates data fragment priority weighting in accordance with some embodiments.

FIG. 9 illustrates data fragment priority weighting 900 in accordance with some embodiments. In weighting 900, an unequal prioritization approach can be implemented. For example, each of a number of fragments of a payload are provided with an unequal priority weighting (for example, a high priority weighting Y of 1.0 near the beginning and end of the payload, and a slightly lower priority near the middle of the payload). In some embodiments, such an approach can be used with a payload where header and footer information must get to the destination, but mid-frame fragments can proceed on a best-effort approach. In some embodiments, for example, the fragments illustrated on the horizontal axis of weighting 800 can represent fragments in a payload corresponding to a new image or video sequence. Such an unequal weighting 900 can be implemented with any of the techniques described herein (for example, by one or more of block prioritization subsystem 506 of FIG. 5, prioritization 600 of FIG. 6, prioritization 700 of FIG. 7, IoT device 1100 of FIG. 11, or processor 1202 of FIG. 12 executing instructions stored on machine readable medium 1200).

Figure 10:
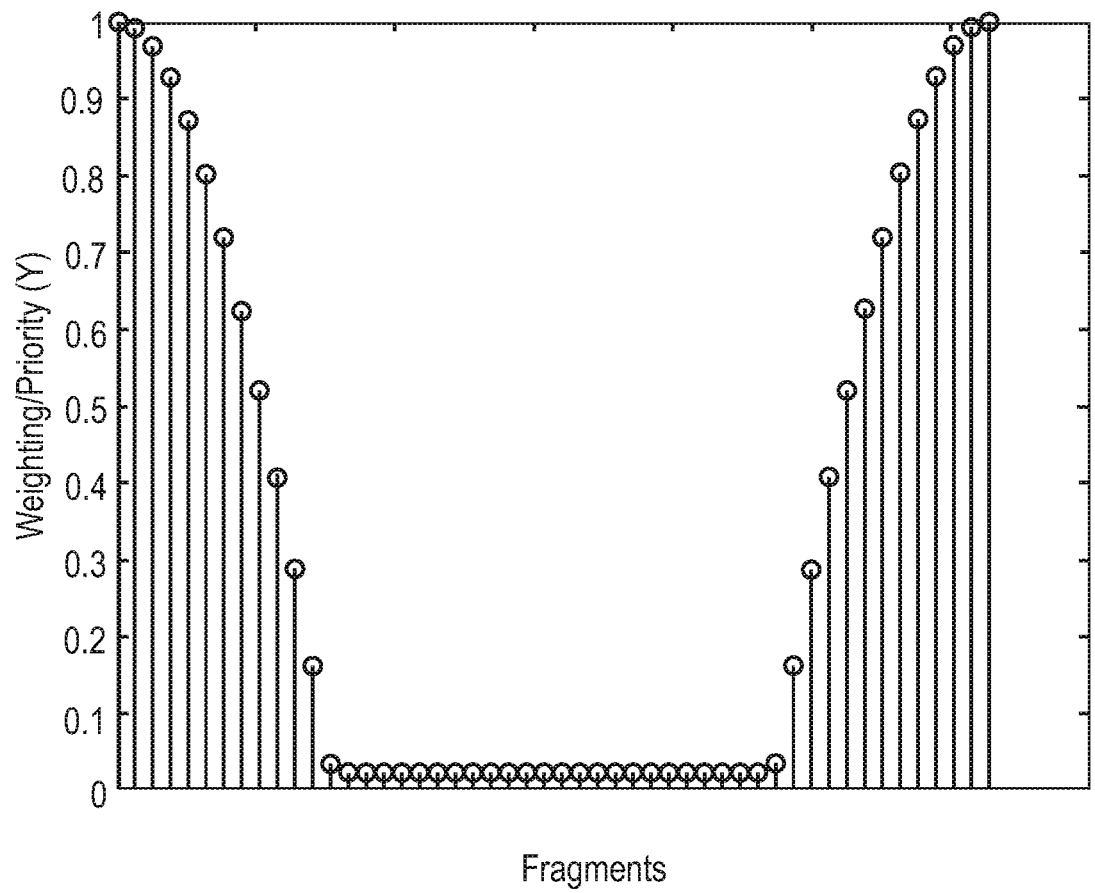
FIG. 10 illustrates data fragment priority weighting in accordance with some embodiments.

FIG. 10 illustrates data fragment priority weighting 1000 in accordance with some embodiments. In weighting 1000, an unequal prioritization approach can be implemented. For example, each of a number of fragments of a payload are provided with an unequal priority weighting (for example, a high priority weighting Y of 1.0 near the beginning and end of the payload, and a significantly lower priority near the middle of the payload). In some embodiments, such an approach can be used with a payload where header and footer information must get to the destination, but mid-frame fragments are not very necessary. The weighting 1000 illustrated in FIG. 10 would prioritize header and footer information, but could proceed even if large amounts of mid-frame fragments were not received by the destination nodes (or simply dropped prior to dispatch). In some embodiments, for example, the fragments illustrated on the horizontal axis of weighting 1000 can represent fragments in a payload corresponding to a repeated image or video sequence, where the repeated image contains essentially the same data as a preceding image and therefore represents data that is not necessary). Such an unequal weighting 1000 can be implemented with any of the techniques described herein (for example, by one or more of block prioritization subsystem 506 of FIG. 5, prioritization 600 of FIG. 6, prioritization 700 of FIG. 7, IoT device 1100 of FIG. 11, or processor 1202 of FIG. 12 executing instructions stored on machine readable medium 1200).

Other weighting embodiments can be implemented. For example, in some embodiments, if an image in a high information value context is used (for example, in a security/monitoring context), the image might be weighted as illustrated by weighting 800 of FIG. 8. However, if a subsequent image did not show any significant new content relative to the previous image, a repeated image weighting can be used in a later image (for example, as in weighting 900 of FIG. 9). This can result in a new image in which mid-frame fragments are de-prioritized and/or dropped in the later image even though the image is used in a high information value context. A loss of mid-frame fragments in such an embodiment may result in some minor visible image aberrations (for example, in the middle part of the image), but information content can be essentially preserved to provide the scene image. The information value can be preserved in such an embodiment since no new activity is detected in the image scene.

It is noted that example image and video embodiments are discussed in reference to FIGS. 8-10. However, it is noted that other embodiments also apply, and embodiments are not limited to image and video payloads. Other weightings occur in some embodiments based on the context of the information being conveyed and the relative importance of different fragments within a payload, for example. In some embodiments, qualitative analysis can be done at the receiving end and prioritization weightings can be adjusted accordingly. Therefore, in some embodiments, prioritization or weighting can be dynamically adjustable (for example, based on feedback provided to an IoT device such as an endpoint IoT device from an upstream IoT device).

Figure 11:
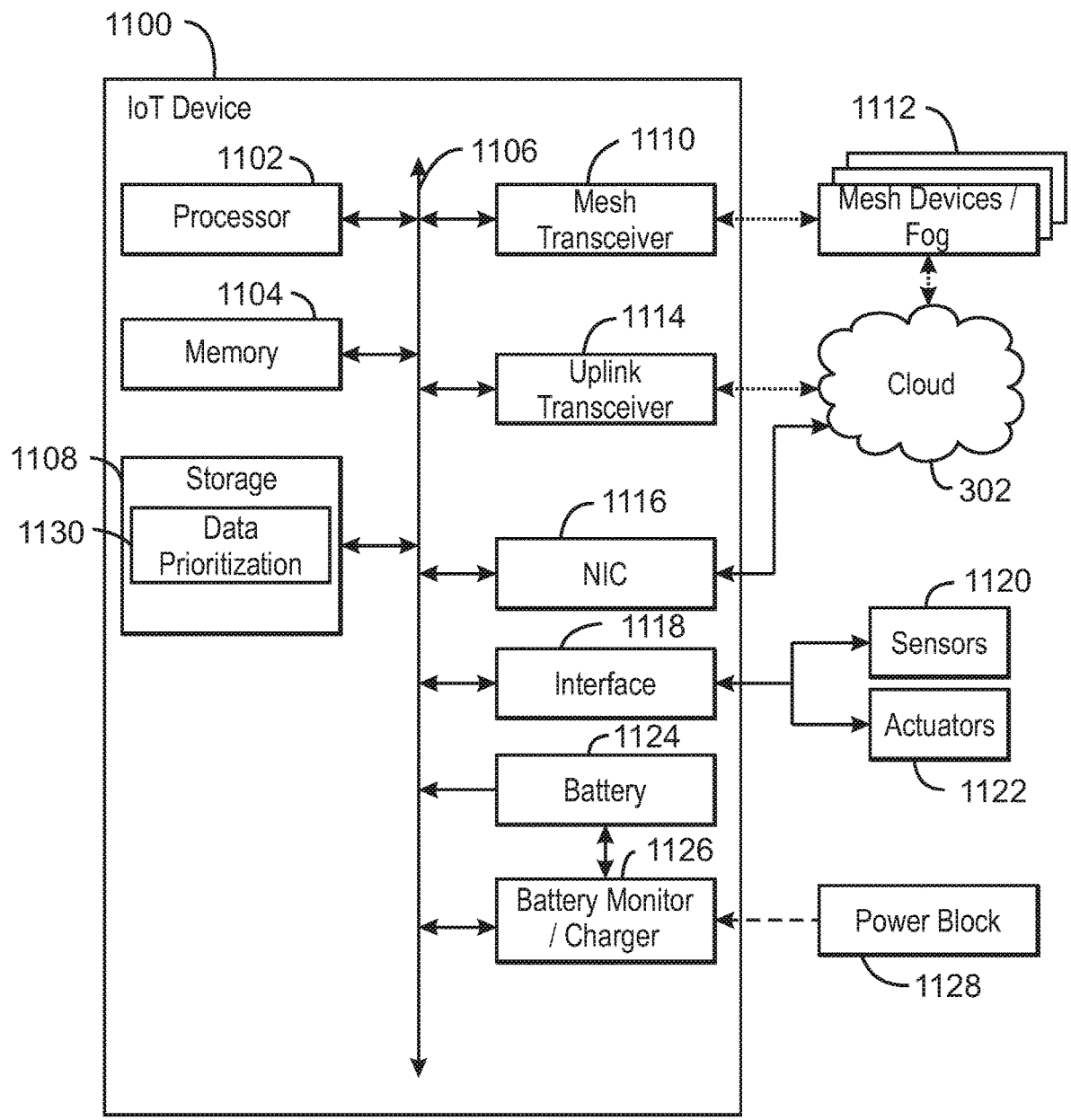
FIG. 11 is a block diagram of an example of components that may be present in an IoT device for implementing data block prioritization in accordance with some embodiments.

FIG. 11 is a block diagram of an example of components that may be present in an IoT device 1100 for implementing data block prioritization (or, for example, packet prioritization or fragment prioritization). In some embodiments, IoT device 1100 can implement any of the techniques illustrated or described herein. The IoT device 1100 may include any combinations of the components shown in the example. The components may be implemented as ICs, portions thereof, discrete electronic devices, or other modules, logic, hardware, software, firmware, or a combination thereof adapted in the IoT device 1100, or as components otherwise incorporated within a chassis of a larger system. The block diagram of FIG. 11 is intended to show a high level view of components of the IoT device 1100. However, some of the components shown may be omitted, additional components may be present, and different arrangement of the components shown may occur in other implementations.

The IoT device 1100 may include a processor 1102, which may be a microprocessor, a multi-core processor, a multi-threaded processor, an ultra-low voltage processor, an embedded processor, or other known processing element. The processor 1102 may be a part of a system on a chip (SoC) in which the processor 1102 and other components are formed into a single integrated circuit, or a single package, such as the Edison™ or Galileo™ SoC boards from Intel. As an example, the processor 1102 may include an Intel® Architecture Core™ based processor, such as a Quark™, an Atom™, an i3, an i5, an i7, a Xeon®, a Xeon Phi™ co-processor, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 1102 may communicate with a system memory 1104 over a bus 1106. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDlMMs or MiniDIMMs. For example, a memory may be sized between 2GB and 16GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 1108 may also be coupled to the processor 1102 via the bus 1106. To enable a thinner and lighter system design, the mass storage 1108 may be implemented via a solid state drive (SSD). Other devices that may be used for the mass storage 1108 include flash memory cards, such as SD cards, microSD cards, xD picture cards, and the like, and USB flash drives.

In low power implementations, the mass storage 1108 may be on-die memory or registers associated with the processor 1102. However, in some examples, the mass storage 1108 may be implemented using a micro hard disk drive (HDD). Further, any number of new technologies may be used for the mass storage 1108 in addition to, or instead of, the technologies described, such resistance change memories, phase change memories, holographic memories, or chemical memories, among others. For example, the IoT device 1100 may incorporate the 3D XPOINT memories from Intel® and Micron®.

The components may communicate over the bus 1106. The bus 1106 may include any number of technologies, including industry standard architecture (ISA), extended ISA (EISA), peripheral component interconnect (PCI), peripheral component interconnect extended (PCIx), PCI express (PCIe), or any number of other technologies. The bus 1106 may be a proprietary bus, for example, used in a SoC based system. Other bus systems may be included, such as an I²C interface, I³C interface, an SPI interface, point to point interfaces, and a power bus, among others.

The bus 1106 may couple the processor 1102 to a mesh transceiver 1110, for communications with other mesh devices 1112. The mesh transceiver 1110 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1112. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 1110 may communicate using multiple standards or radios for communications at different range. For example, the IoT device 1100 may communicate with geographically proximate devices, e.g., within about 10 meters, using a local transceiver based on BLE, or another low power radio, to save power. More distant mesh devices 1112, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 1110 may be incorporated into an MCU as an address directly accessible by the chip, such as in the Curie® units available from Intel.

An uplink transceiver 1114 may be included to communicate with devices in the cloud 302. The uplink transceiver 1114 may be LPWA transceiver that follows the IEEE 802.15.4, IEEE 802.15.4g, IEEE 802.15.4e, IEEE 802.15.4k, or NB-IoT standards, among others. The IoT device 1100 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, Weightless-P from the Weightless Special Interest Group, Random Phase Multiple Access (RPMA®) from Ingenu, and other technologies. Further, other communications techniques, such as time-slotted channel hopping, described in the IEEE 802.15.4e specification may be used.

Any number of other radio communications and protocols may be used in addition to the systems mentioned for the mesh transceiver 1110 and uplink transceiver 1114, as described herein. For example, the radio transceivers 1110 and 1112 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The radio transceivers 1110 and 1112 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+(High-speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 1114, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1116 may be included to provide a wired communication to the cloud 302 or to other devices, such as the mesh devices 1112. The wired communication may provide an Ethernet connection, or may be based on other types of networks, such as Controller Area Network (CAN), Local Interconnect Network (LIN), DeviceNet, ControlNet, Data Highway+, EtherCAT, SERCOS, PROFIBUS, PROFINET RT, or PROFINET IRT, among many others. An additional NIC 1116 may be included to allow connection to a second network, for example, a NIC 1116 providing communications to the cloud over Ethernet, and a second NIC 1116 providing communications to other devices over another type of network.

The bus 1106 may couple the processor 1102 to an interface 1118 that is used to connect external devices. The external devices may include sensors 1120, such as accelerometers, level sensors, flow sensors, temperature sensors, pressure sensors, barometric pressure sensors, and the like. The interface 1118 may be used to connect the IoT device 1100 to actuators 1122, such as power switches, valve actuators, an audible sound generator, a visual warning device, and the like.

While not shown, various input/output (I/O) devices may be present within, or connected to, the IoT device 1100. For example, a display may be included to show information, such as sensor readings or actuator position. An input device, such as a touch screen or keypad may be included to accept input.

A battery 1124 may power the IoT device 1100, although in examples in which the IoT device 1100 is mounted in a fixed location, it may have a power supply coupled to an electrical grid. The battery 1124 may be a lithium ion battery, a metal-air battery, such as a zinc-air battery, an aluminum-air battery, a lithium-air battery, a hybrid supercapacitor, and the like.

A battery monitor/charger 1126 may be included in the IoT device 1100 to track the state of charge (SoCh) of the battery 1120. The battery monitor/charger 1126 may be used to monitor other parameters of the battery 1124 to provide failure predictions, such as the state of health (SoH) and the state of function (SoF) of the battery 1124. The battery monitor/charger 1126 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1126 may communicate the information on the battery 1124 to the processor 1102 over the bus 1106. The battery monitor/charger 1126 may also include an analog-to-digital (ADC) convertor that allows the processor 1102 to directly monitor the voltage of the battery 1126 or the current flow from the battery 1124. The battery parameters may be used to determine actions that the IoT device 1100 may perform, such as transmission frequency, mesh network operation, sensing frequency, and the like.

A power block 1128, or other power supply coupled to a grid, may be coupled with the battery monitor/charger 1126 to charge the battery 1124. In some examples, the power block 1128 may be replaced with a wireless power receiver to obtain the power wirelessly, for example, through a loop antenna in the IoT device 1100. A wireless battery charging circuit, such as an LTC4020 chip from Linear Technologies of Milpitas, Calif., among others, may be included in the battery monitor/charger 1126. The specific charging circuits chosen depend on the size of the battery 1124, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 1128 may be augmented or replaced with solar panels, a wind generator, a water generator, or other natural power systems.

The mass storage 1108 may include a number of modules to implement prioritization, or any other techniques described herein. Although shown as code blocks in the mass storage 1108, it may be understood that any of the modules may be fully or partially replaced with hardwired circuits, for example, built into an application specific integrated circuit (ASIC). The mass storage 1108 may include data prioritization 1130 according to some embodiments. Prioritization 1130 can include code to implement any of the techniques described herein, including one or more of data block prioritization, packet prioritization, fragment prioritization, or weighting, among others. In some embodiments, IoT device 1100 can include a system or a subsystem to implement any of the techniques described herein. For example, in some embodiments, IoT device can be or can include a system or subsystem such as block prioritization subsystem 506 of FIG. 5.

Examples and embodiments of various techniques have been illustrated and described herein as being implemented, for example, using a processor executing stored instructions. However, it is noted that other examples and embodiments of any of these techniques can includes other implementations. For example, any of the techniques illustrated or described herein can be implemented in any of hardware, software, firmware, or in any combination thereof. Some embodiments can be implemented, for example, using an Application Specific Integrated Circuit (ASIC) or a Field Programmable Gate Array (FPGA), among others.

Figure 12:
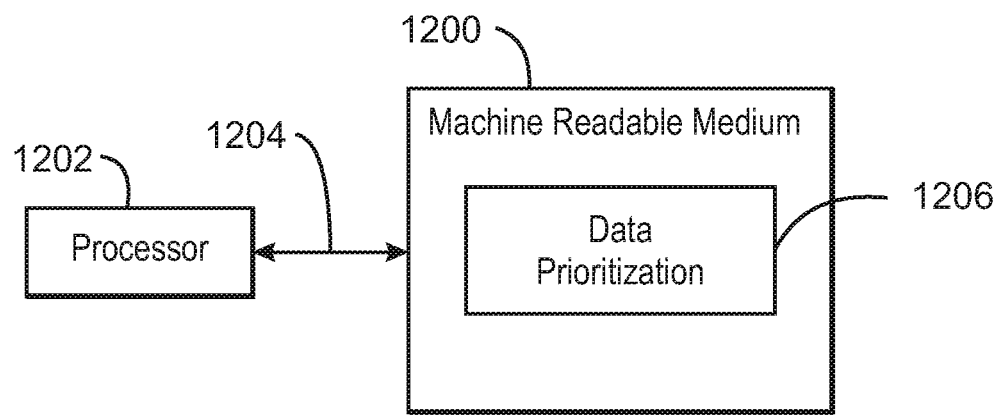
FIG. 12 is a block diagram of a non-transitory, machine readable medium including code to direct a processor to implement data block prioritization in accordance with some embodiments.

FIG. 12 is a block diagram of an exemplary non-transitory, machine readable medium 1200 including code to direct a processor 1202 to implement data prioritization in accordance with some embodiments. The processor 1202 may access the non-transitory, machine readable medium 1200 over a bus 1204. The processor 1202 and bus 1204 may be selected as described with respect to the processor 1102 and bus 1106 of FIG. 11. The non-transitory, machine readable medium 1200 may include devices described for the mass storage 1108 of FIG. 11 or may include optical disks, thumb drives, or any number of other hardware devices.

The non-transitory, machine readable medium 1200 may include code 1206 to direct the processor 1202 to implement to implement any of the techniques described herein, including one or more of data block prioritization, packet prioritization, fragment prioritization, or weighting, among others.

In some embodiments, the techniques described herein can be implemented by a processor such as processor 1102 or processor 1202 running software or firmware, or some combination thereof. However, in some embodiments, the techniques described herein may be implemented using other types of processors or controllers. For example, in some embodiments, the techniques described herein may be implemented by an FPGA (field programmable gate array), for example.

The techniques described herein may be used to implement any number of IoT networks for various purposes. Additional applications may be implemented.

Example 1 includes an Internet of Things (IoT) device including storage to store instructions, and a processor to execute the stored instructions to prioritize data blocks of a data payload by dynamically assigning priority levels of the data blocks, and to transmit one or more of the data blocks based on the prioritizing.

Example 2 includes the subject matter of example 1. In example 2, the processor is to execute the stored instructions to prioritize each of the data blocks of the data payload based on perceived information value of that data block.

Example 3 includes the subject matter of any of examples 1-2. In example 3, the processor is to execute the stored instructions to adjust the prioritizing based on analysis of received data blocks.

Example 4 includes the subject matter of any of examples 1-3. In example 4, the processor is to execute the stored instructions to limit a number of transmission re-try attempts for a data block based on the prioritizing.

Example 5 includes the subject matter of any of examples 1-4. In example 5, the processor is to execute the stored instructions to refrain from allowing any transmission re-try attempts for one or more of the data blocks based on the prioritizing.

Example 6 includes the subject matter of any of examples 1-5. In example 6, the processor is to execute the stored instructions to refrain from sending one or more of the data blocks based on the prioritizing.

Example 7 includes the subject matter of any of examples 1-6. In example 7, the processor is to execute the stored instructions to prioritize each of the data blocks of the data payload based on an average weighting applied to the data block.

Example 8 includes the subject matter of any of examples 1-7. In example 8, the processor is to execute the stored instructions to prioritize each of the data blocks of the data payload based on a product of summation of a set of external information value metrics.

Example 9 includes the subject matter of any of examples 1-8. In example 9, the processor is to execute the stored instructions to prioritize each of the data blocks of the data payload based on a product of summation of two sets of external information value metrics.

Example 10 includes the subject matter of any of examples 1-9. In example 10, the processor is to execute the stored instructions to prioritize each of the data blocks of the data payload based on assigning a high priority to header and footer information and assigning a lower priority to mid-frame image information.

Example 11 includes a method of prioritizing a data payload in an Internet of Things (IoT) network, including prioritizing data blocks of a data payload by dynamically assigning priority levels of the data blocks, and transmitting one or more of the data blocks based on the prioritizing.

Example 12 includes the subject matter of example 11. In example 12, the method includes prioritizing each of the data blocks of the data payload based on perceived information value of that data block.

Example 13 includes the subject matter of any of examples 11-12. In example 13, the method includes adjusting the prioritizing based on analysis of received data blocks.

Example 14 includes the subject matter of any of examples 11-13. In example 14, the method includes limiting a number of transmission re-try attempts for a data block based on the prioritizing.

Example 15 includes the subject matter of any of examples 11-14. In example 15, the method includes refraining from allowing any transmission re-try attempts for one or more of the data blocks based on the prioritizing.

Example 16 includes the subject matter of any of examples 11-15. In example 16, the method includes refraining from sending one or more of the data blocks based on the prioritizing.

Example 17 includes the subject matter of any of examples 11-16. In example 17, the method includes prioritizing each of the data blocks of the data payload based on an average weighting applied to the data block.

Example 18 includes the subject matter of any of examples 11-17. In example 18, the method includes prioritizing each of the data blocks of the data payload based on a product of summation of a set of external information value metrics.

Example 19 includes the subject matter of any of examples 11-18. In example 19, the method includes prioritizing each of the data blocks of the data payload based on a product of summation of two sets of external information value metrics.

Example 20 includes the subject matter of any of examples 11-19. In example 20, the method includes prioritizing each of the data blocks of the data payload based on assigning a high priority to header and footer information and assigning a lower priority to mid-frame image information.

Example 21 includes a non-transitory computer readable medium including instructions that, when executed, direct a processor to prioritize data blocks of a data payload by dynamically assigning priority levels of the data blocks, and transmit one or more of the data blocks based on the prioritizing.

Example 22 includes the subject matter of example 21. In example 22, the non-transitory computer readable medium includes instructions that, when executed, direct a processor to prioritize each of the data blocks of the data payload based on perceived information value of that data block.

Example 23 includes the subject matter of any of examples 21-22. In example 23, the non-transitory computer readable medium includes instructions that, when executed, direct a processor to adjust the prioritizing based on analysis of received data blocks.

Example 24 includes the subject matter of any of examples 21-23. In example 24, the non-transitory computer readable medium includes instructions that, when executed, direct a processor to limit a number of transmission re-try attempts for a data block based on the prioritizing.

Example 25 includes the subject matter of any of examples 21-24. In example 25, the non-transitory computer readable medium includes instructions that, when executed, direct a processor to refrain from allowing any transmission re-try attempts for one or more of the data blocks based on the prioritizing.

Example 26 includes the subject matter of any of examples 21-25. In example 26, the non-transitory computer readable medium includes instructions that, when executed, direct a processor to refrain from sending one or more of the data blocks based on the prioritizing.

Example 27 includes the subject matter of any of examples 21-26. In example 27, the non-transitory computer readable medium includes instructions that, when executed, direct a processor to prioritize each of the data blocks of the data payload based on an average weighting applied to the data block.

Example 28 includes the subject matter of any of examples 21-27. In example 28, the non-transitory computer readable medium includes instructions that, when executed, direct a processor to prioritize each of the data blocks of the data payload based on a product of summation of a set of external information value metrics.

Example 29 includes the subject matter of any of examples 21-28. In example 29, the non-transitory computer readable medium includes instructions that, when executed, direct a processor to prioritize each of the data blocks of the data payload based on a product of summation of two sets of external information value metrics.

Example 30 includes the subject matter of any of examples 21-29. In example 30, the non-transitory computer readable medium includes instructions that, when executed, direct a processor to prioritize each of the data blocks of the data payload based on assigning a high priority to header and footer information and assigning a lower priority to mid-frame image information.

Example 31 includes an Internet of Things (IoT) network, including a first IoT device, and a second IoT device. The second IoT device includes storage to store instructions, and a processor to execute the stored instructions to prioritize data blocks of a data payload by dynamically assigning priority levels of the data blocks, and to transmit one or more of the data blocks to the first IoT device based on the prioritizing.

Example 32 includes the subject matter of example 31. In example 32, the processor is to execute the stored instructions to prioritize each of the data blocks of the data payload based on perceived information value of that data block.

Example 33 includes the subject matter of any of examples 31-32. In example 33, the processor is to execute the stored instructions to adjust the prioritizing based on analysis of received data blocks at the first IoT device.

Example 34 includes the subject matter of any of examples 31-33. In example 34, the processor is to execute the stored instructions to limit a number of transmission re-try attempts for a data block based on the prioritizing.

Example 35 includes the subject matter of any of examples 31-34. In example 35, the processor is to execute the stored instructions to refrain from allowing any transmission re-try attempts for one or more of the data blocks based on the prioritizing.

Example 36 includes the subject matter of any of examples 31-35. In example 36, the processor is to execute the stored instructions to refrain from sending one or more of the data blocks based on the prioritizing.

Example 37 includes the subject matter of any of examples 31-36. In example 37, the processor is to execute the stored instructions to prioritize each of the data blocks of the data payload based on an average weighting applied to the data block.

Example 38 includes the subject matter of any of examples 31-37. In example 38, the processor is to execute the stored instructions to prioritize each of the data blocks of the data payload based on a product of summation of a set of external information value metrics.

Example 39 includes the subject matter of any of examples 31-38. In example 39, the processor is to execute the stored instructions to prioritize each of the data blocks of the data payload based on a product of summation of two sets of external information value metrics.

Example 40 includes the subject matter of any of examples 31-39. In example 40, the processor is to execute the stored instructions to prioritize each of the data blocks of the data payload based on assigning a high priority to header and footer information and assigning a lower priority to mid-frame image information.

Example 41 includes an Internet of Things (IoT) device including means for prioritizing data blocks of a data payload by dynamically assigning priority levels of the data blocks, and means for transmitting one or more of the data blocks based on the prioritizing.

Example 42 includes the subject matter of example 41. In example 42, the apparatus includes means for prioritizing each of the data blocks of the data payload based on perceived information value of that data block.

Example 43 includes the subject matter of any of examples 41-42. In example 43, the apparatus includes means for adjusting the prioritizing based on analysis of received data blocks.

Example 44 includes the subject matter of any of examples 41-43. In example 44, the apparatus includes means for limiting a number of transmission re-try attempts for a data block based on the prioritizing.

Example 45 includes the subject matter of any of examples 41-44. In example 45, the apparatus includes means for refraining from allowing any transmission re-try attempts for one or more of the data blocks based on the prioritizing.

Example 46 includes the subject matter of any of examples 41-45. In example 46, the apparatus includes means for refraining from sending one or more of the data blocks based on the prioritizing.

Example 47 includes the subject matter of any of examples 41-46. In example 47, the apparatus includes means for prioritizing each of the data blocks of the data payload based on an average weighting applied to the data block.

Example 48 includes the subject matter of any of examples 41-47. In example 48, the apparatus includes means for prioritizing each of the data blocks of the data payload based on a product of summation of a set of external information value metrics.

Example 49 includes the subject matter of any of examples 41-48. In example 49, the apparatus includes means for prioritizing each of the data blocks of the data payload based on a product of summation of two sets of external information value metrics.

Example 50 includes the subject matter of any of examples 41-49. In example 50, the apparatus includes means for prioritizing each of the data blocks of the data payload based on assigning a high priority to header and footer information and assigning a lower priority to mid-frame image information.

Example 51 includes an Internet of Things (IoT) device including a prioritizer to prioritize data blocks of a data payload by dynamically assigning priority levels of the data blocks, and a transmitter to transmit one or more of the data blocks based on the prioritizing.

Example 52 includes the subject matter of example 51. In example 52, the prioritizer is to prioritize each of the data blocks of the data payload based on perceived information value of that data block.

Example 53 includes the subject matter of any of examples 51-52. In example 53, the prioritizer is to adjust the prioritizing based on analysis of received data blocks.

Example 54 includes the subject matter of any of examples 51-53. In example 54, the prioritizer is to limit a number of transmission re-try attempts for a data block based on the prioritizing.

Example 55 includes the subject matter of any of examples 51-54. In example 55, the prioritizer is to refrain from allowing any transmission re-try attempts for one or more of the data blocks based on the prioritizing.

Example 56 includes the subject matter of any of examples 51-55. In example 56, the prioritizer is to refrain from sending one or more of the data blocks based on the prioritizing.

Example 57 includes the subject matter of any of examples 51-56. In example 57, the prioritizer is to prioritize each of the data blocks of the data payload based on an average weighting applied to the data block.

Example 58 includes the subject matter of any of examples 51-57. In example 58, the prioritizer is to prioritize each of the data blocks of the data payload based on a product of summation of a set of external information value metrics.

Example 59 includes the subject matter of any of examples 51-58. In example 59, the prioritizer is to prioritize each of the data blocks of the data payload based on a product of summation of two sets of external information value metrics.

Example 60 includes the subject matter of any of examples 51-59. In example 60, the prioritizer is to prioritize each of the data blocks of the data payload based on assigning a high priority to header and footer information and to assign a lower priority to mid-frame image information.

Example 61 includes an apparatus including means to perform a method as in any other example.

Example 62 includes machine-readable storage including machine-readable instructions, when executed, to implement a method or realize an apparatus as in any other example.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need to be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A method of prioritizing a data payload in an Internet of Things (IoT) network, comprising:
  receiving a sensor reading value representing a measured parameter;
  determining a difference between the sensor reading value and a previous value of the measured parameter;
  adding the sensor reading value to a data payload comprising a plurality of data blocks;
  prioritizing the data blocks of the data payload by dynamically assigning priority levels to the data blocks, wherein priority levels of data blocks that include header and footer data are higher than priority levels of data blocks that do not include header and footer data, and wherein a priority level of the data block that includes the sensor reading value is increased if the difference is above a specified threshold and decreased if the difference is below the specified threshold; and
  transmitting one or more of the data blocks, wherein the priority level assigned to each data block determines a number of re-tries to be performed if the data block is not received.

2. The method of claim 1, comprising prioritizing each of the data blocks of the data payload based on perceived information value of that data block.

3. The method of claim 1, comprising adjusting the prioritizing based on analysis of received data blocks.

4. The method of claim 1, comprising limiting a number of transmission re-try attempts for a data block based on the prioritizing.

5. An Internet of Things (IoT) device, comprising:
  a sensor for detecting a measured parameter;
  a processor; and
  storage that stores instructions that, when executed, direct the processor to:
  receive a sensor reading value from the sensor representing the measured parameter;
  determine a difference between the sensor reading value and a previous value of the measured parameter;
  add the sensor reading value to a data payload comprising a plurality of data blocks;

prioritize the data blocks of the data payload by dynamically assigning priority levels to the data blocks, wherein priority levels of data blocks that include header and footer data are higher than priority levels of data blocks that do not include header and footer data, and wherein a priority level of the data block that includes the sensor reading value is increased if the difference is above a specified threshold and decreased if the difference is below the specified threshold; and transmit one or more of the data blocks, wherein the priority level assigned to each data block determines a number of re-tries to be performed if the data block is not received.

6. The IoT device of claim 5, wherein the processor is to execute the stored instructions to:
prioritize each of the data blocks of the data payload based on perceived information value of that data block.

7. The IoT device of claim 5, wherein the processor is to execute the stored instructions to:
adjust the prioritizing based on analysis of received data blocks.

8. The IoT device of claim 5, wherein the processor is to execute the stored instructions to:
limit a number of transmission re-try attempts for a data block based on the prioritizing.

9. The IoT device of claim 5, wherein the processor is to execute the stored instructions to:
refrain from allowing any transmission re-try attempts for one or more of the data blocks based on the prioritizing.

10. The IoT device of claim 5, wherein the processor is to execute the stored instructions to:
refrain from sending one or more of the data blocks based on the prioritizing.

11. The IoT device of claim 5, wherein the processor is to execute the stored instructions to:
prioritize each of the data blocks of the data payload based on an average weighting applied to the data block.

12. The IoT device of claim 5, wherein the processor is to execute the stored instructions to:
prioritize each of the data blocks of the data payload based on a product of summation of a set of external information value metrics.

13. The IoT device of claim 5, wherein the processor is to execute the stored instructions to:
prioritize each of the data blocks of the data payload based on a product of summation of two sets of external information value metrics.

14. The IoT device of claim 5, wherein the data payload represents an image, and wherein the processor is to execute the stored instructions to:
prioritize each of the data blocks of the data payload based on assigning a high priority to header and footer information and assigning a lower priority to mid-frame image information.

15. A non-transitory computer readable medium comprising instructions that, when executed, direct a processor to:
receive a sensor reading value representing a measured parameter;
determine a difference between the sensor reading value and a previous value of the measured parameter;
add the sensor reading value to a data payload comprising a plurality of data blocks;
prioritize the data blocks of the data payload by dynamically assigning priority levels to the data blocks, wherein priority levels of data blocks that include header and footer data are higher than priority levels of data blocks that do not include header and footer data, and wherein a priority level of the data block that includes the sensor reading value is increased if the difference is above a specified threshold and decreased if the difference is below the specified threshold; and transmit one or more of the data blocks, wherein the priority level assigned to each data block determines a number of re-tries to be performed if the data block is not received.

16. The non-transitory computer readable medium of claim 15, comprising instructions that, when executed, direct a processor to:
prioritize each of the data blocks of the data payload based on perceived information value of that data block.

17. The non-transitory computer readable medium of claim 15, comprising instructions that, when executed, direct a processor to:
adjust the prioritizing based on analysis of received data blocks.

18. The non-transitory computer readable medium of claim 15, comprising instructions that, when executed, direct a processor to:
limit a number of transmission re-try attempts for a data block based on the prioritizing.

19. An Internet of Things (IoT) network, comprising:
a first IoT device; and
a second IoT device, comprising:
a processor; and
storage that stores instructions that, when executed, direct the processor to:
receive a sensor reading value representing a measured parameter;
determine a difference between the sensor reading value and a previous value of the measured parameter;
add the sensor reading value to a data payload comprising a plurality of data blocks;
prioritize the data blocks of the data payload by dynamically assigning priority levels to the data blocks, wherein priority levels of data blocks that include header and footer data are higher than priority levels of data blocks that do not include header and footer data, and wherein a priority level of the data block that includes the sensor reading value is increased if the difference is above a specified threshold and decreased if the difference is below the specified threshold; and
transmit one or more of the data blocks to the first IoT device, wherein the priority level assigned to each data block determines a number of re-tries to be performed if the data block is not received.

20. The IoT network of claim 19, wherein the processor is to execute the stored instructions to:
prioritize each of the data blocks of the data payload based on perceived information value of that data block.

21. The IoT network of claim 19, wherein the processor is to execute the stored instructions to:
adjust the prioritizing based on analysis of received data blocks at the first IoT device.

22. The IoT network of claim 19, wherein the processor is to execute the stored instructions to:
limit a number of transmission re-try attempts for a data block based on the prioritizing.

* * * * *